US010383048B2

(12) United States Patent
Zhuang et al.

(10) Patent No.: US 10,383,048 B2
(45) Date of Patent: Aug. 13, 2019

(54) CELL SELECTION METHOD IN WIRELESS NETWORK, BASE STATION, AND USER EQUIPMENT

(71) Applicant: Huawei Technologies Co., Ltd., Shenzhen (CN)

(72) Inventors: Hongcheng Zhuang, Shenzhen (CN); Jietao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 15/448,189

(22) Filed: Mar. 2, 2017

(65) Prior Publication Data
US 2017/0223626 A1 Aug. 3, 2017

Related U.S. Application Data

(63) Continuation of application No. PCT/CN2014/085750, filed on Sep. 2, 2014.

(51) Int. Cl.
H04W 88/06 (2009.01)
H04W 52/24 (2009.01)
(Continued)

(52) U.S. Cl.
CPC .......... *H04W 48/20* (2013.01); *H04B 17/318* (2015.01); *H04B 17/336* (2015.01); *H04L 5/0048* (2013.01); *H04L 43/0882* (2013.01); *H04L 43/0894* (2013.01); *H04W 52/242* (2013.01); *H04W 88/06* (2013.01); *H04W 88/08* (2013.01)

(58) Field of Classification Search
CPC ..... H04W 88/06; H04W 48/12; H04W 48/18; H04W 52/24; H04W 52/242
See application file for complete search history.

(56) References Cited

U.S. PATENT DOCUMENTS

2008/0188228 A1* 8/2008 Pecen ................... H04W 48/18
455/449
2009/0264123 A1 10/2009 Agashe et al.
(Continued)

FOREIGN PATENT DOCUMENTS

CN 101583164 A 11/2009
CN 102469497 A 5/2012
(Continued)

*Primary Examiner* — Raj Jain
(74) *Attorney, Agent, or Firm* — Slater Matsil, LLP

(57) ABSTRACT

Embodiments of the present invention disclose a cell selection method in a wireless network, a base station, and user equipment. The method includes: determining, by a base station, available uplink and downlink capacities of each cell in a coverage area of the base station; determining available uplink and downlink capacities of a backhaul link of the base station; calculating an uplink offset and a downlink offset of each cell according to the available uplink and downlink capacities of each cell and the available uplink and downlink capacities of the backhaul link of the base station; determining an uplink path loss of user equipment (UE); and sending a message to the UE, where the message carries the uplink path loss of the UE, the uplink offset, and the downlink offset, which are used by the UE to perform cell selection.

12 Claims, 7 Drawing Sheets

(51) Int. Cl.
*H04W 88/08* (2009.01)
*H04W 48/20* (2009.01)
*H04B 17/318* (2015.01)
*H04B 17/336* (2015.01)
*H04L 5/00* (2006.01)
*H04L 12/26* (2006.01)

(56) References Cited

U.S. PATENT DOCUMENTS

| | | | |
|---|---|---|---|
| 2011/0223918 A1* | 9/2011 | Dahlen | H04W 24/00 |
| | | | 455/436 |
| 2013/0215787 A1 | 8/2013 | Jeong et al. | |
| 2014/0329516 A1 | 11/2014 | Falconetti et al. | |
| 2014/0334318 A1* | 11/2014 | Pica | H04W 36/14 |
| | | | 370/252 |
| 2017/0223626 A1* | 8/2017 | Zhuang | H04W 48/20 |

FOREIGN PATENT DOCUMENTS

| | | |
|---|---|---|
| CN | 103039112 A | 4/2013 |
| EP | 2293638 A1 | 3/2011 |
| EP | 2786617 A1 | 10/2014 |
| GB | 2391755 A | 2/2004 |
| JP | 2009302645 A | 12/2009 |
| WO | 2013028128 A1 | 2/2013 |
| WO | 2013060807 A2 | 5/2013 |
| WO | 2013079090 A1 | 6/2013 |
| WO | 2013135269 A1 | 9/2013 |
| WO | 2014014667 A1 | 1/2014 |

* cited by examiner

CELL SELECTION METHOD IN WIRELESS NETWORK, BASE STATION, AND USER EQUIPMENT

CROSS-REFERENCE TO RELATED APPLICATIONS

This application is a continuation of International Application No. PCT/CN2014/085750, filed on Sep. 2, 2014, the disclosure of which is hereby incorporated by reference in its entirety.

TECHNICAL FIELD

The present invention relates to the field of communications technologies, and in particular, to a cell selection method in a wireless network, a base station, and user equipment.

BACKGROUND

A development trend of a next generation wireless network is network heterogeneity and densification. On a heterogeneous network (HetNet), a macro cell provides basic and continuous coverage in a wide area, and a small cell provides local coverage in a small area, so as to improve coverage for a blind spot or increase a capacity of a system for a hotspot area. To further meet a user requirement for a high-speed data rate and increase a capacity of a network system, wireless access points need to be densely deployed on a network. Network densification imposes a very high requirement for a capability of a backhaul link, and use of a wireless backhaul link is a potential method. In addition, with service diversification, connections of a next generation wireless network are increasingly complex, and connections such as an Machine-to-Machine (M2M) connection are included.

Conventional cell selection is based on signal strength, and a terminal selects a cell that has a best reference signal as a serving cell or a cell to be camped on. Because capabilities of cells on the HetNet are different, a cell selection mechanism based on the signal strength is inappropriate.

SUMMARY

In view of this, embodiments of the present invention provide a cell selection method in a wireless network, a base station, and user equipment. In the method, a feature of an access network, a feature of a backhaul link, and a feature of a service are fully considered, and both an uplink service and a downlink service that match UE can be taken into consideration for cell selection, so as to achieve better network performance.

According to a first aspect, an embodiment of the present invention provides a cell selection method in a wireless network. The method includes determining available uplink and downlink capacities of each cell in multiple cells covered by a base station. The method also includes determining available uplink and downlink capacities of a backhaul link of the base station. The method also includes determining an uplink offset and a downlink offset of each cell according to the available uplink and downlink capacities of each cell and the available uplink and downlink capacities of the backhaul link of the base station. The method also includes determining an uplink path loss of user equipment UE. The method also includes sending a message to the UE, where the message carries the uplink path loss of the UE, the uplink offset, and the downlink offset, and the uplink path loss, the uplink offset, and the downlink offset are used by the UE to perform cell selection.

With reference to the first aspect, in a first possible implementation manner, the determining available uplink and downlink capacities of each cell in multiple cells covered by a base station is specifically: performing grid division on each cell; determining a maximum capacity of each cell according to a system bandwidth, a service volume of each grid, and a signal-to-noise ratio of a reference signal of each grid; obtaining uplink and downlink throughputs of each cell; and determining the available uplink and downlink capacities of each cell, where the available uplink capacity of each cell is a difference obtained by subtracting the uplink throughput from the maximum capacity of each cell, and the available downlink capacity of each cell is a difference obtained by subtracting the downlink throughput from the maximum capacity of each cell.

With reference to the first aspect, in a second possible implementation manner, the determining available uplink and downlink capacities of a backhaul link of the base station is specifically: obtaining maximum uplink and downlink capacities of the backhaul link of the base station; obtaining uplink and downlink throughputs of the backhaul link of the base station; and determining the available uplink and downlink capacities of the backhaul link of the base station, where the available uplink capacity of the backhaul link of the base station is a difference obtained by subtracting the uplink throughput from the maximum uplink capacity of the backhaul link of the base station, and the available downlink capacity of the backhaul link of the base station is a difference obtained by subtracting the downlink throughput from the maximum downlink capacity of the backhaul link of the base station.

With reference to the first aspect, or the first or the second possible implementation manner of the first aspect, in a third possible implementation manner, an uplink offset of the cell is calculated according to the following formula:

$$UCR \propto \alpha \text{Capacity}_{c,UL}^{avl} + (1-\alpha)\text{Capacity}_{bck,UL}^{avl},$$

where UCR is an uplink offset of a cell c, $\text{Capacity}_{c,UL}^{avl}$ is an available uplink capacity of the cell c, $\text{Capacity}_{bck,UL}^{avl}$ is an available uplink capacity of a backhaul link of the base station, and α is a ratio of an importance degree of an uplink access link to an importance degree of an uplink backhaul link.

With reference to the first aspect, or the first, or the second possible implementation manner of the first aspect, in a fourth possible implementation manner, a downlink offset of the cell is calculated according to the following formula:

$$CRE \propto \beta \text{Capacity}_{c,DL}^{avl} + (1-\beta)\text{Capacity}_{bck,DL}^{avl},$$

where CRE is a downlink offset of a cell c, $\text{Capacity}_{c,DL}^{avl}$ is an available downlink capacity of the cell c, $\text{Capacity}_{bck,DL}^{avl}$ is an available downlink capacity of a backhaul link of the base station, and β is a ratio of an importance degree of a downlink access link to an importance degree of a downlink backhaul link.

According to a second aspect, an embodiment of the present invention provides a cell selection method in a wireless network. The method includes receiving, by user equipment UE, a message sent by a base station, where the message carries an uplink path loss of the UE, and uplink offsets and downlink offsets of multiple cells covered by the base station. The method also includes determining a reference signal received power. The method also includes, when the UE is in a non-idle state, selecting, by the UE, a cell that has a maximum difference obtained by subtracting the uplink path loss from the uplink offset as an uplink cell, and selecting a cell that has a maximum sum of the downlink offset and the reference signal received power as a downlink cell.

With reference to the second aspect, in a first possible implementation manner, the method further includes: when the UE is in an idle state, selecting, by the UE, a cell that has a maximum sum of the downlink offset and the reference signal received power as a serving cell of the UE.

With reference to the second aspect, in a second possible implementation manner, the selecting, by the UE, a cell that has a maximum difference obtained by subtracting the uplink path loss from the uplink offset as an uplink cell, and selecting a cell that has a maximum sum of the downlink offset and the reference signal received power as a downlink cell is specifically: when the UE is in the non-idle state and a service volume is greater than a threshold, selecting, by the UE, the cell that has a maximum difference obtained by subtracting the uplink path loss from the uplink offset as the uplink cell, and selecting the cell that has a maximum sum of the downlink offset and the reference signal received power as the downlink cell.

With reference to the second aspect, in a third possible implementation manner, the method further includes: when the UE is in the non-idle state and a service volume of the UE is less than or equal to a threshold, selecting, by the UE, the cell that has a maximum sum of the downlink offset and the reference signal received power as the serving cell.

With reference to the second aspect, or the second possible implementation manner of the second aspect, in a fourth possible implementation manner, the selecting, by the UE when the UE is in a non-idle state, a cell that has a maximum difference obtained by subtracting the uplink path loss from the uplink offset as an uplink cell, and selecting a cell that has a maximum sum of the downlink offset and the reference signal received power as a downlink cell is specifically: when the UE is in the non-idle state and an uplink/downlink service ratio of the UE falls within a preset interval, selecting, by the UE, the cell that has a maximum difference obtained by subtracting the uplink path loss from the uplink offset as the uplink cell, and selecting the cell that has a maximum sum of the downlink offset and the reference signal received power as the downlink cell.

With reference to the second aspect, or the third, possible implementation manner of the second aspect, in a fifth possible implementation manner, when the UE is in the non-idle state, the method further includes: when an uplink/downlink service ratio is greater than a maximum value of a preset interval, selecting the cell that has a maximum difference obtained by subtracting the uplink path loss from the uplink offset as the serving cell; or when an uplink/downlink service ratio is less than a minimum value of a preset interval, selecting the cell that has a maximum sum of the downlink offset and the reference signal received power as the serving cell.

According to a third aspect, an embodiment of the present invention provides a base station. The base station includes: a first determining unit, configured to determine available uplink and downlink capacities of each cell in multiple cells covered by the base station. The base station also includes a second determining unit, configured to determine available uplink and downlink capacities of a backhaul link of the base station. The base station also includes a calculation unit, configured to determine an uplink offset and a downlink offset of each cell according to the available uplink and downlink capacities of each cell and the available uplink and downlink capacities of the backhaul link of the base station. The base station also includes a statistics collecting unit, configured to determine an uplink path loss of user equipment UE. The base station also includes a sending unit, configured to send a message to the UE, where the message carries the uplink path loss, the uplink offset, and the downlink offset, and the uplink path loss, the uplink offset, and the downlink offset are used by the UE to perform cell selection.

With reference to the third aspect, in a first possible implementation manner, the first determining unit is specifically configured to: perform grid division on each cell; determine a maximum capacity of each cell according to a system bandwidth, a service volume of each grid, and a signal-to-noise ratio of a reference signal of each grid; obtain uplink and downlink throughputs of each cell; and determine the available uplink and downlink capacities of each cell, where the available uplink capacity of each cell is a difference obtained by subtracting the uplink throughput from the maximum capacity of each cell, and the available downlink capacity of each cell is a difference obtained by subtracting the downlink throughput from the maximum capacity of each cell.

With reference to the third aspect, in a second possible implementation manner, the second determining unit is specifically configured to: obtain maximum uplink and downlink capacities of the backhaul link of the base station; obtain uplink and downlink throughputs of the backhaul link of the base station; and determine the available uplink and downlink capacities of the backhaul link of the base station, where the available uplink capacity of the backhaul link of the base station is a difference obtained by subtracting the uplink throughput from the maximum uplink capacity of the backhaul link of the base station, and the available downlink capacity of the backhaul link of the base station is a difference obtained by subtracting the downlink throughput from the maximum downlink capacity of the backhaul link of the base station.

With reference to the third aspect, or the first, or the second possible implementation manner of the third aspect, in a third possible implementation manner, the calculation unit includes: a first calculation unit, configured to calculate the uplink offset according to the following formula:

$$UCR \propto \alpha Capacity_{c,UL}^{avl} + (1-\alpha) Capacity_{bck,UL}^{avl},$$

where UCR is an uplink offset of a cell c, $Capacity_{c,UL}^{avl}$ is an available uplink capacity of the cell c, $Capacity_{bck,UL}^{avl}$ is an available uplink capacity of a backhaul link of the base station, and $\alpha$ is a ratio of an importance degree of an uplink access link to an importance degree of an uplink backhaul link.

With reference to the third aspect, or the first, or the second possible implementation manner of the third aspect, in a fourth possible implementation manner, the calculation unit includes: a second calculation unit, configured to calculate the downlink offset according to the following formula:

$$CRE \propto \beta Capacity_{c,DL}^{avl} + (1-\beta) Capacity_{bck,DL}^{avl},$$

where CRE is a downlink offset of a cell c, $Capacity_{c,DL}^{avl}$ is an available downlink capacity of the cell c, $Capacity_{bck,DL}^{avl}$ is an available downlink capacity of a backhaul link of the base station, and $\beta$ is a ratio of an importance degree of a downlink access link to an importance degree of a downlink backhaul link.

According to a fourth aspect, an embodiment of the present invention provides a UE. The UE includes: a receiving unit, configured to receive messages sent by at least two base stations, where each of the messages carries an uplink path loss of the UE, and an uplink offset and a downlink offset of a cell covered by each base station. The UE also includes a determining unit, configured to determine a reference signal received power. The UE also includes a processing unit, configured to: when the UE is in a non-idle state, select a cell that has a maximum difference obtained by subtracting the uplink path loss from the uplink offset as an uplink cell, and select a cell that has a maximum sum of the downlink offset and the reference signal received power as a downlink cell.

With reference to the fourth aspect, in a first possible implementation manner, the processing unit is further configured to: when the UE is in an idle state, select a cell that has a maximum sum of the downlink offset and the reference signal received power as a serving cell of the UE.

With reference to the fourth aspect, in a second possible implementation manner, the processing unit is further specifically configured to: when the UE is in the non-idle state and a service volume is greater than a threshold, select the cell that has a maximum difference obtained by subtracting the uplink path loss from the uplink offset as the uplink cell, and select the cell that has a maximum sum of the downlink offset and the reference signal received power as the downlink cell.

With reference to the fourth aspect, in a third possible implementation manner, the processing unit is further specifically configured to: when the UE is in the non-idle state and a service volume of the UE is less than or equal to a threshold, select the cell that has a maximum sum of the downlink offset and the reference signal received power as the serving cell.

With reference to the fourth aspect, or the second possible implementation manner of the fourth aspect, in a fourth possible implementation manner, the processing unit is further specifically configured to: when the UE is in the non-idle state and an uplink/downlink service ratio of the UE falls within a preset interval, select the cell that has a maximum difference obtained by subtracting the uplink path loss from the uplink offset as the uplink cell, and select the cell that has a maximum sum of the downlink offset and the reference signal received power as the downlink cell.

With reference to the fourth aspect, or the third possible implementation manner of the fourth aspect, in a fifth possible implementation manner, when the UE is in the non-idle state, the processing unit is further configured to: when an uplink/downlink service ratio is greater than a maximum value of a preset interval, select the cell that has a maximum difference obtained by subtracting the uplink path loss from the uplink offset as the serving cell; or when an uplink/downlink service ratio is less than a minimum value of a preset interval, select the cell that has a maximum sum of the downlink offset and the reference signal received power as the serving cell.

According to a fifth aspect, an embodiment of the present invention provides a base station. The base station includes: a processor, a memory, and an application program physically stored in the memory. The application program includes instructions that can be used by the processor to perform the following process: determining available uplink and downlink capacities of each cell in multiple cells covered by the base station; determining available uplink and downlink capacities of a backhaul link of the base station; determining an uplink offset and a downlink offset of each cell according to the available uplink and downlink capacities of each cell and the available uplink and downlink capacities of the backhaul link of the base station; determining an uplink path loss of user equipment UE; and sending a message to the UE, where the message carries the uplink path loss, the uplink offset, and the downlink offset, and the uplink path loss, the uplink offset, and the downlink offset are used by the UE to perform cell selection.

With reference to the fifth aspect, in a first possible implementation manner, the application program includes the following instructions used by the processor to determine the available uplink and downlink capacities of each cell in a coverage area of the base station: performing grid division on each cell; determining a maximum capacity of each cell according to a system bandwidth, a service volume of each grid, and a signal-to-noise ratio of a reference signal of each grid; obtaining uplink and downlink throughputs of each cell; and determining the available uplink and downlink capacities of each cell, where the available uplink capacity of each cell is a difference obtained by subtracting the uplink throughput from the maximum capacity of each cell, and the available downlink capacity of each cell is a difference obtained by subtracting the downlink throughput from the maximum capacity of each cell.

With reference to the fifth aspect, in a second possible implementation manner, the application program includes the following instructions used by the processor to determine the available uplink and downlink capacities of the backhaul link of the base station: obtaining maximum uplink and downlink capacities of the backhaul link of the base station; obtaining uplink and downlink throughputs of the backhaul link of the base station; and determining the available uplink and downlink capacities of the backhaul link of the base station, where the available uplink capacity of the backhaul link of the base station is a difference obtained by subtracting the uplink throughput from the maximum uplink capacity of the backhaul link of the base station, and the available downlink capacity of the backhaul link of the base station is a difference obtained by subtracting the downlink throughput from the maximum downlink capacity of the backhaul link of the base station.

With reference to the fifth aspect, or the first or the second possible implementation manner of the fifth aspect, in a third possible implementation manner, the application program specifically includes the following instruction used by the processor to calculate the uplink offset: the application program is used by the processor to calculate the uplink offset according to a formula $$UCR \propto \alpha \text{Capacity}_{c,UL}^{avl} + (1-\alpha)\text{Capacity}_{bck,UL}^{avl},$$

where UCR is an uplink offset of a cell c, $\text{Capacity}_{c,UL}^{avl}$ is an available uplink capacity of the cell c, $\text{Capacity}_{bck,UL}^{avl}$ is an available uplink capacity of a backhaul link of the base station, and $\alpha$ is a ratio of an importance degree of an uplink access link to an importance degree of an uplink backhaul link.

With reference to the fifth aspect, or the first, or the second possible implementation manner of the fifth aspect, in a fourth possible implementation manner, the application program specifically includes the following instruction used by the processor to calculate the downlink offset: the application program is used by the processor to calculate the downlink offset according to a formula $$CRE \propto \beta \text{Capacity}_{c,DL}^{avl} + (1-\beta)\text{Capacity}_{bck,DL}^{avl},$$

where CRE is a downlink offset of a cell c, $\text{Capacity}_{c,DL}^{avl}$ is an available downlink capacity of the cell c, Capacity$_{bck,DL}^{avl}$ is an available downlink capacity of a backhaul link of the base station, and β is a ratio of an importance degree of a downlink access link to an importance degree of a downlink backhaul link.

According to a sixth aspect, an embodiment of the present invention provides a UE. The UE includes: a processor, a memory, and an application program physically stored in the memory, where the application program includes instructions that can be used by the processor to perform the following process: receiving messages sent by at least two base stations, where the messages carry an uplink path loss of the UE, an uplink offset, and a downlink offset; determining a reference signal received power; and when the UE is in a non-idle state, selecting a cell that has a maximum difference obtained by subtracting the uplink path loss from the uplink offset as an uplink cell, and selecting a cell that has a maximum sum of the downlink offset and the reference signal received power as a downlink cell.

With reference to the sixth aspect, in a first possible implementation manner, the application program further includes an instruction that can be used by the processor to perform the following process: when the UE is in an idle state, selecting a cell that has a maximum sum of the downlink offset and the reference signal received power as a serving cell of the UE.

With reference to the sixth aspect, in a second possible implementation manner, the application program includes the following instructions that can be used by the processor to perform a process in which when the UE is in a non-idle state, selecting a cell that has a maximum difference obtained by subtracting the uplink path loss from the uplink offset as an uplink cell, and selecting a cell that has a maximum sum of the downlink offset and the reference signal received power as a downlink cell: when the UE is in the non-idle state and a service volume is greater than a threshold, selecting the cell that has a maximum difference obtained by subtracting the uplink path loss from the uplink offset as the uplink cell, and selecting the cell that has a maximum sum of the downlink offset and the reference signal received power as the downlink cell.

With reference to the sixth aspect, in a third possible implementation manner, the application program includes the following instruction that can be used by the processor to perform a process in which when the UE is in an non-idle state, selecting a cell that has a maximum sum of the downlink offset and the reference signal received power as a serving cell of the UE: when the UE is in the non-idle state and a service volume of the UE is less than or equal to a threshold, selecting the cell that has a maximum sum of the downlink offset and the reference signal received power as the serving cell.

With reference to the sixth aspect, or the second possible implementation manner of the sixth aspect, in a fourth possible implementation manner, the application program includes the following instructions that can be used by the processor to perform a process in which when the UE is in a non-idle state, selecting a cell that has a maximum difference obtained by subtracting the uplink path loss from the uplink offset as an uplink cell, and selecting a cell that has a maximum sum of the downlink offset and the reference signal received power as a downlink cell: when the UE is in the non-idle state and an uplink/downlink service ratio of the UE falls within a preset interval, selecting the cell that has a maximum difference obtained by subtracting the uplink path loss from the uplink offset as the uplink cell, and selecting the cell that has a maximum sum of the downlink offset and the reference signal received power as the downlink cell.

With reference to the sixth aspect, or the third possible implementation manner of the sixth aspect, in a fifth possible implementation manner, when the UE is in the non-idle state, the application program further includes instructions that can be used by the processor to perform the following process: when an uplink/downlink service ratio is greater than a maximum value of a preset interval, selecting the cell that has a maximum difference obtained by subtracting the uplink path loss from the uplink offset as the serving cell; or when an uplink/downlink service ratio is less than a minimum value of a preset interval, selecting the cell that has a maximum sum of the downlink offset and the reference signal received power as the serving cell.

According to the cell selection method in a wireless network provided in the embodiments of the present invention, an uplink offset and a downlink offset of a cell are calculated according to available uplink and downlink capacities of the cell and available uplink and downlink capacities of a backhaul link of a base station, and an uplink path loss, the uplink offset, and the downlink offset are sent to UE, so that the UE can perform cell selection according to the uplink path loss, the uplink offset, and the downlink offset that are sent by the base station. In the method, a feature of an access network, a feature of a backhaul link, and a feature of a service are fully considered, and both an uplink service and a downlink service that match UE can be taken into consideration for cell selection, so as to achieve better network performance.

BRIEF DESCRIPTION OF THE DRAWINGS

For a more complete understanding of the present invention, and the advantages thereof, reference is now made to the following descriptions taken in conjunction with the accompanying drawings, in which.

The technical solutions in the embodiments of the present invention are further described in detail with reference to accompanying drawings and embodiments.

DETAILED DESCRIPTION OF ILLUSTRATIVE EMBODIMENTS

The following describes the embodiments of the present invention in detail with reference to accompanying drawings. It should be clear that the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention can be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), and a future wireless communications system.

It should further be understood that in the embodiments of the present invention, user equipment (UE) may be referred to as a terminal, a mobile station (MS), a mobile terminal, or the like. The user equipment may communicate with one or more core networks through a radio access network (RAN). For example, the user equipment may be a mobile phone (also referred to as a "cellular" phone) or a computer with a mobile terminal. For example, the user equipment may also be a portable, pocket-sized, handheld, wearable, computer built-in, or in-vehicle mobile apparatus, which exchanges voice and/or data with the radio access network.

In the embodiments of the present invention, a base station may be a base transceiver station (BTS) in GSM or CDMA, or may be a NodeB (NB) in WCDMA, or an evolved Node B (eNB or e-NodeB) in LTE, or may be a device that has a similar function with a base station and that is in a wireless network in the future, which is not limited in the present invention. For ease of description, a base station and user equipment are used as examples for description in the following embodiments; however, the method described in the present invention may also be similarly applied to communication between other entities (for example, a terminal and another terminal).

For ease of description, "uplink and downlink" is referred to as "uplink/downlink" in the embodiments of the present invention.

Embodiment 1

Figure 1:
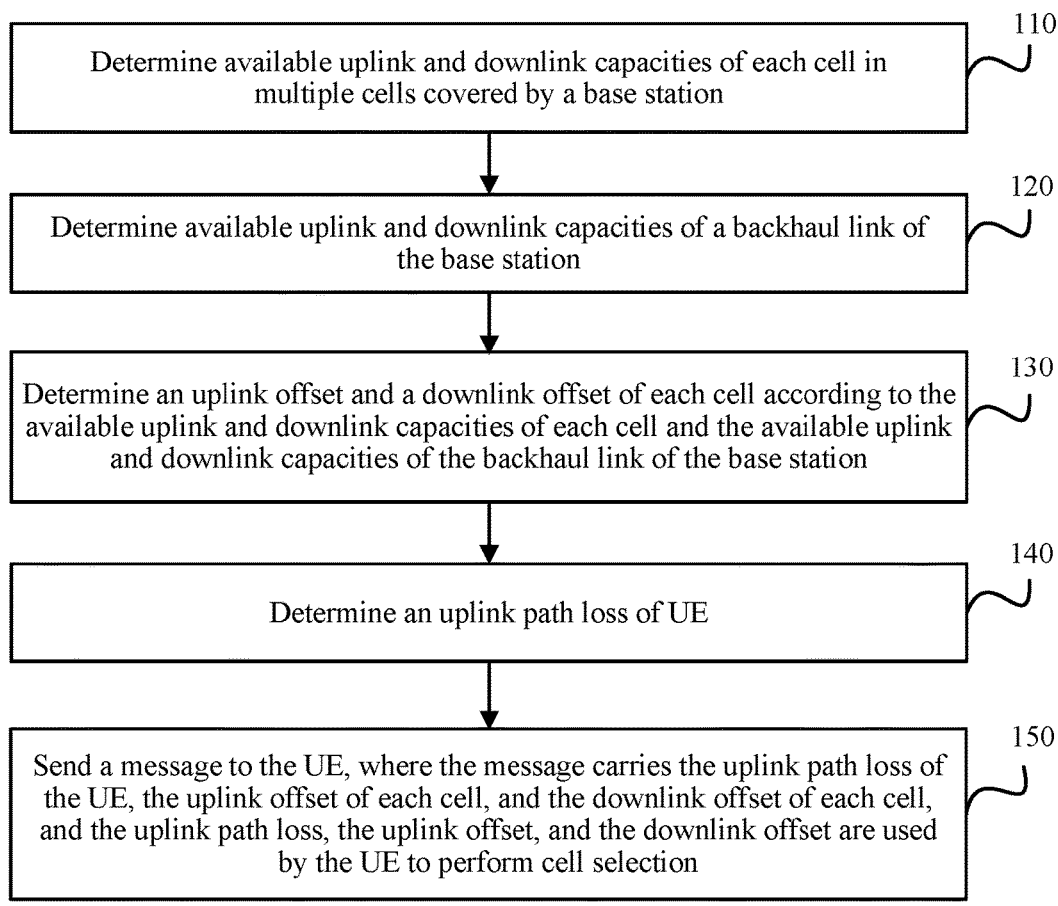
FIG. 1 is a flowchart of a cell selection method in a wireless network according to Embodiment 1 of the present invention.

Embodiment 1 of the present invention provides a cell selection method in a wireless network. FIG. 1 is a flowchart of a cell selection method in a wireless network according to this embodiment of the present invention. In this embodiment, the method is executed by a base station. The base station may include one or more cells, where "more" is generally 3. The method specifically includes the following steps.

Step 110: Determine available uplink and downlink capacities of each cell in multiple cells covered by the base station.

Specifically, available uplink and downlink capacities of a cell depend on a capability of a base station, a distribution status of a neighboring base station, and a service status of a service user. The available uplink and downlink capacities of the cell may be specifically determined by using the following steps.

Step 110-1: Perform grid division on each cell.

Step 110-2: Determine a maximum capacity of each cell according to a system bandwidth, a service volume of each grid, and a signal-to-noise ratio of a reference signal of each grid.

For example, a maximum capacity of a cell c may be calculated by using the following formula 1:

$$\text{Capacity}_{c,DL}^{max} = \frac{W \sum_{p \in c} T_p}{\sum_{p \in c} T_p \log_2^{-1}(1 + \gamma_p^{RS})} \quad \text{(Formula 1)}$$

where W is a system bandwidth; $T_p$ is a service volume of a grid p, and is obtained by means of statistics collection; and $\gamma_p^{RS}$ is a signal-to-noise ratio of a reference signal of the grid p.

$$\gamma_p^{RS} = \frac{P_c g_p^c}{P_{noise} + \sum_{d \neq c} P_d g_p^d} \quad \text{(Formula 2)}$$

where $P_c$ and $P_d$ are respectively a transmit power of a cell c and a transmit power of a cell d, where the cell d is a neighboring cell of the cell c; $P_{noise}$ is a noise power; and $g_p^c$ and $g_p^d$ are respectively a channel gain from the cell c to the grid p and a channel gain from the cell d to the grid p.

Conventionally, a capacity is generally defined as an arithmetic average value of a data rate of UE. However, in this solution, a capacity is defined as a harmonic average value of a rate. Compared with the arithmetic average value, the harmonic average value can ensure a better compromise between fairness and a capacity.

Step 110-3: Obtain uplink and downlink throughputs of each cell.

Specifically, uplink and downlink throughputs corresponding to an allocated resource of a cell is a used capacity of the cell.

Step 110-4: Determine the available uplink and downlink capacities of each cell, where the available uplink capacity of each cell is a difference obtained by subtracting the uplink throughput from the maximum capacity of each cell, and the available downlink capacity of each cell is a difference obtained by subtracting the downlink throughput from the maximum capacity of each cell.

Specifically, an available capacity of the cell may be obtained by subtracting the used capacity of the cell from a maximum capacity of the cell.

For example, an available downlink capacity of the cell c may be represented by using a formula:

$$\text{Capacity}_{c,DL}^{avl} = \text{Capacity}_{c,DL}^{max} - \text{Throughput}_{c,DL} \quad \text{(Formula 3)}$$

$\text{Throughput}_{c,DL}$ is a downlink throughput corresponding to an allocated resource of the cell c, and may be obtained based on statistics collection.

An available uplink capacity of the cell c may also be calculated by using a similar method, and details are not described herein again.

Step 120: Determine available uplink and downlink capacities of a backhaul link of the base station.

Specifically, the determining available uplink and downlink capacities of a backhaul link of the base station may be specifically implemented by using the following step 120-1 to step 120-3.

Step 120-1: Obtain maximum uplink and downlink capacities of the backhaul link of the base station.

Based on different deployments and applications, a backhaul link of a 5G base station may include different types of backhaul links, such as an optical fiber link, a copper cable link, a microwave link, and a millimeter wave link. Therefore, the backhaul link may have different backhaul link capacities. In different networking forms such as tree-like networking and mesh networking, backhaul links of all base stations have different maximum uplink and downlink capacities.

Maximum uplink and downlink capacities of a backhaul link of a base station may be obtained by querying an operation, administration and maintenance (OAM) system, or obtained by receiving a periodic broadcast of the OAM system or a broadcast that is provided when backhaul link configuration changes.

Step 120-2: Obtain uplink and downlink throughputs of the backhaul link of the base station.

Specifically, uplink and downlink throughputs of a backhaul link corresponding to an allocated backhaul link resource of the base station are obtained by means of statistics collection.

Step 120-3: Determine the available uplink and downlink capacities of the backhaul link of the base station, where the available uplink capacity of the backhaul link of the base station is a difference obtained by subtracting the uplink throughput from the maximum uplink capacity of the backhaul link of the base station, and the available downlink capacity of the backhaul link of the base station is a difference obtained by subtracting the downlink throughput from the maximum downlink capacity of the backhaul link of the base station.

For example, an available downlink capacity of a backhaul link of the base station is:

$$\text{Capacity}_{bck,DL}^{avl} = \text{Capacity}_{bck,DL}^{max} - \text{Throughput}_{bck,DL} \quad \text{(Formula 4)}$$

where $\text{Capacity}_{bck,DL}^{max}$ is a maximum downlink capacity of the backhaul link of the base station, and $\text{Throughput}_{bck,DL}$ is a downlink throughput of the backhaul link corresponding to the allocated backhaul link resource of the base station.

An available uplink capacity of a backhaul link of the base station may also be calculated by using a similar method, and details are not described herein again.

Step 130: Determine an uplink offset and a downlink offset of each cell according to the available uplink and downlink capacities of each cell and the available uplink and downlink capacities of the backhaul link of the base station.

Specifically, the uplink offset is calculated according to the following formula:

$$UCR \propto \alpha \text{Capacity}_{c,UL}^{avl} + (1-\alpha)\text{Capacity}_{bck,UL}^{avl} \quad \text{(Formula 5)}$$

where UCR is an uplink offset of the cell c, $\text{Capacity}_{c,UL}^{avl}$ is an available uplink capacity of the cell c, $\text{Capacity}_{bck,UL}^{avl}$ is an available uplink capacity of a backhaul link of the base station, and α is a ratio of an importance degree of an uplink access link to an importance degree of an uplink backhaul link. In a specific example, a typical value of α may be preferably o.6.

The downlink offset is calculated according to the following formula:

$$CRE \propto \beta \text{Capacity}_{c,DL}^{avl} + (1-\beta)\text{Capacity}_{bck,DL}^{avl} \quad \text{(Formula 6)}$$

where CRE is a downlink offset of a cell, $\text{Capacity}_{c,DL}^{avl}$ is an available downlink capacity of the cell c, $\text{Capacity}_{bck,DL}^{avl}$ is an available downlink capacity of a backhaul link of the base station, and β is a ratio of an importance degree of a downlink access link to an importance degree of a downlink backhaul link. In a specific example, a typical value of β may be preferably o.6.

Step 140: Determine an uplink path loss of UE.

Specifically, the uplink path loss of the UE is obtained by the base station by means of statistics collection.

Step 150: Send a message to the UE, where the message carries the uplink path loss of the UE, the uplink offset of each cell, and the downlink offset of each cell; and the uplink path loss of the UE, the uplink offset of each cell, and the downlink offset of each cell are used by the UE to perform cell selection.

Specifically, the base station sends, to the UE, the uplink offset and the downlink offset obtained by using the foregoing steps, and the uplink path loss of the UE obtained by the base station by means of statistics collection, so that the UE performs cell selection according to these parameters. A process in which the UE performs the cell selection according to the parameters is described in detail in the following Embodiment 2.

In the method provided in this embodiment of the present invention, an uplink offset and a downlink offset of a cell are calculated according to available uplink and downlink capacities of the cell and available uplink and downlink capacities of a backhaul link of a base station, and an uplink path loss, the uplink offset, and the downlink offset are sent to UE, so that the UE can perform cell selection according to the uplink path loss, the uplink offset, and the downlink offset that are sent by the base station. In the method, a feature of an access network, a feature of a backhaul link, and a feature of a service are fully considered, and both an uplink service and a downlink service that match UE can be taken into consideration for cell selection, so as to achieve better network performance.

Embodiment 2

Figure 2:
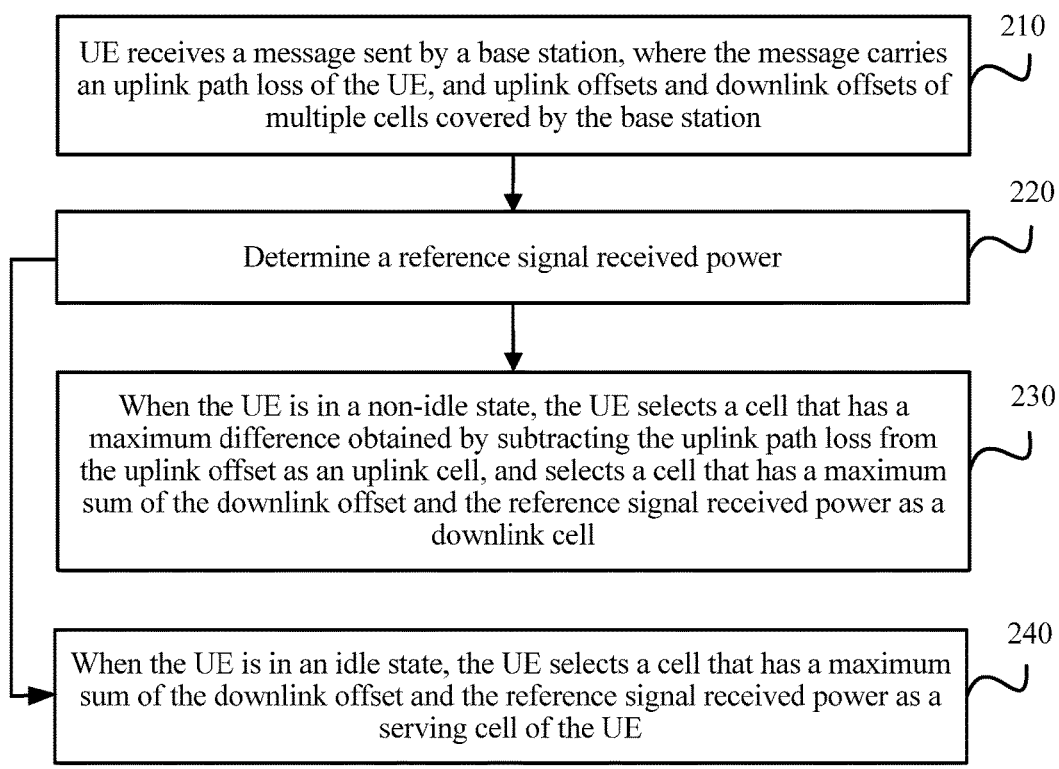
FIG. 2 is a flowchart of a cell selection method in a wireless network according to Embodiment 2 of the present invention.

Embodiment 2 of the present invention provides a cell selection method in a wireless network. FIG. 2 is a flowchart of a cell selection method in a wireless network according to this embodiment of the present invention. In this embodiment, the method is executed by UE. The method specifically includes the following steps.

Step 210: The UE receives a message sent by a base station, where the message carries an uplink path loss of the UE, and uplink offsets and downlink offsets of multiple cells covered by the base station.

The foregoing Embodiment 1 provides detailed description of a specific process in which a base station determines, according to available uplink and downlink capacities of each cell and available uplink and downlink capacities of a backhaul link of the base station, an uplink offset and a downlink offset of each cell. The base station sends the obtained uplink offset and downlink offset, and the uplink path loss of the UE obtained by means of statistics collection to the UE for reception.

Step 220: Determine a reference signal received power.

Specifically, the UE may obtain an RSRP value by means of measurement of the reference signal received power (RSRP).

Step 230: When the UE is in a non-idle state, the UE selects a cell that has a maximum difference obtained by subtracting the uplink path loss from the uplink offset as an uplink cell, and selects a cell that has a maximum sum of the downlink offset and the reference signal received power as a downlink cell.

Optionally, after the UE receives the uplink path loss, the uplink offset, and the downlink offset that are sent by the base station, whether the UE is in an idle state first needs to be determined.

Step 240: When the UE is in an idle state, the UE selects the cell that has a maximum sum of the downlink offset and the reference signal received power as a serving cell of the UE.

The RSRP may be obtained by means of measurement performed by UE.

In the method provided in this embodiment of the present invention, UE may perform cell selection according to an uplink path loss, an uplink offset, and a downlink offset that are sent by a base station. In the method, a feature of an access network, a feature of a backhaul link, and a feature of a service are fully considered, and both an uplink service and a downlink service that match UE can be taken into consideration for cell selection, so as to achieve better network performance.

Embodiment 3

Figure 3:
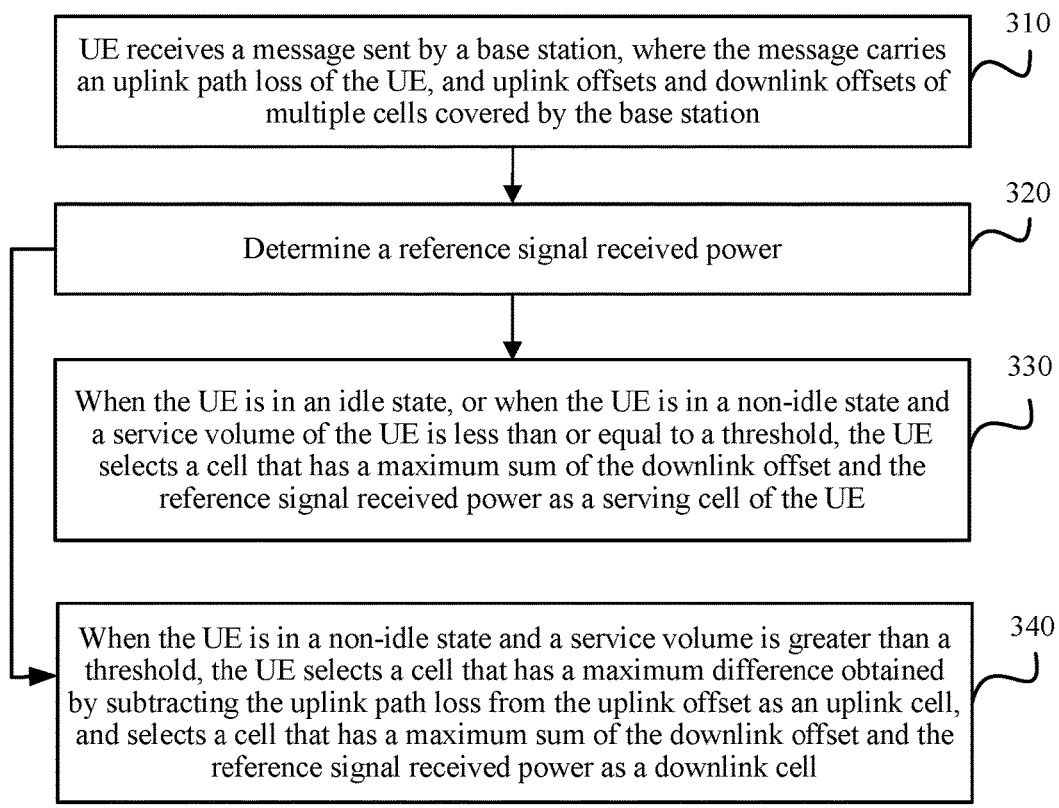
FIG. 3 is a flowchart of a cell selection method in a wireless network according to Embodiment 3 of the present invention.

Based on Embodiment 2, Embodiment 3 of the present invention provides a cell selection method in a wireless network. FIG. 3 is a flowchart of a cell selection method in a wireless network according to this embodiment of the present invention. In this embodiment, the method is executed by UE. The method specifically includes the following steps.

Step 310: The UE receives a message sent by a base station, where the message carries an uplink path loss of the UE, and uplink offsets and downlink offsets of multiple cells covered by the base station.

A specific execution process of step 310 is the same as step 210 in the foregoing embodiment, and details are not described herein again.

Step 320: Determine a reference signal received power.

If a service volume of the UE is not greater than a threshold, step 330 is performed; or if a service volume of the UE is greater than a threshold, step 340 is performed.

Step 330: When the UE is in an idle state, or when the UE is in a non-idle state and a service volume of the UE is less than or equal to a threshold, the UE selects a cell that has a maximum sum of the downlink offset and the reference signal received power as a serving cell of the UE.

Step 340: When the UE is in a non-idle state and a service volume is greater than a threshold, the UE selects a cell that has a maximum difference obtained by subtracting the uplink path loss from the uplink offset as an uplink cell, and selects a cell that has a maximum sum of the downlink offset and the reference signal received power as a downlink cell.

Specifically, the threshold may be determined according to a maximum capacity of a current cell; for example, the threshold is set to the maximum capacity of the cell, 95% of the maximum capacity of the cell, or the like.

Base on the foregoing Embodiment 2, a service requirement condition of the UE is taken into consideration in this embodiment.

Embodiment 4

Figure 4:
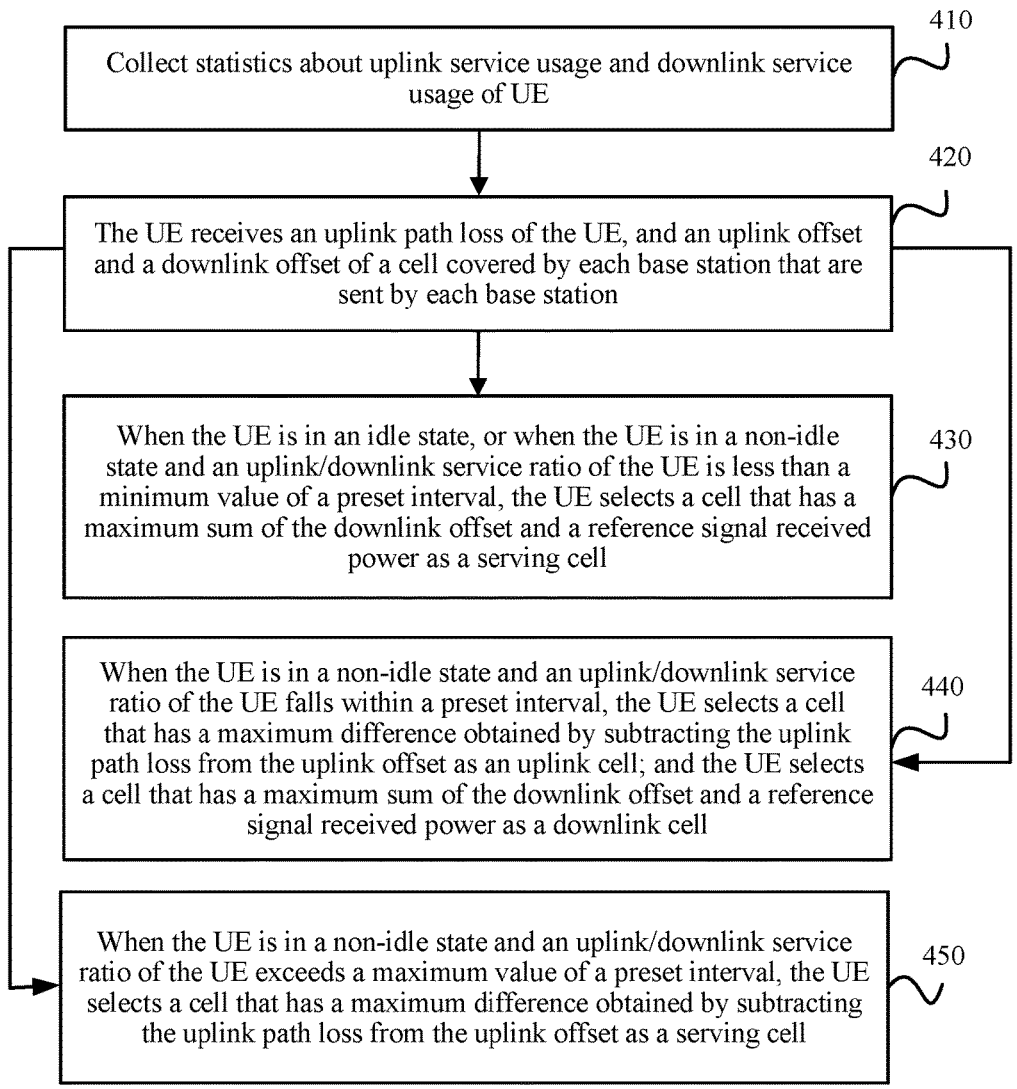
FIG. 4 is a flowchart of a cell selection method in a wireless network according to Embodiment 4 of the present invention.

Based on Embodiment 2, Embodiment 4 of the present invention provides a cell selection method in a wireless network. FIG. 4 is a flowchart of a cell selection method in a wireless network according to this embodiment of the present invention. In this embodiment, the method is executed by UE. The method specifically includes the following steps.

Step 410: Collect statistics about uplink service usage and downlink service usage of the UE, so as to calculate an uplink/downlink service ratio of the UE.

Step 420: The UE receives an uplink path loss of the UE, and an uplink offset and a downlink offset of a cell covered by each base station that are sent by each base station.

A specific execution process of step 420 is the same as step 210 in the foregoing embodiment, and details are not described herein again.

Step 430: When the UE is in an idle state, or when the UE is in a non-idle state and the uplink/downlink service ratio of the UE is less than a minimum value of a preset interval, the UE selects a cell that has a maximum sum of the downlink offset and the reference signal received power as a serving cell.

Step 440: When the UE is in a non-idle state and the uplink/downlink service ratio of the UE falls within a preset interval, the UE selects a cell that has a maximum difference obtained by subtracting the uplink path loss from the uplink offset as an uplink cell; and the UE selects a cell that has a maximum sum of the downlink offset and the reference signal received power as a downlink cell.

Step 450: When the UE is in a non-idle state and the uplink/downlink service ratio of the UE exceeds a maximum value of a preset interval, the UE selects a cell that has a maximum difference obtained by subtracting the uplink path loss from the uplink offset as a serving cell.

Base on the foregoing Embodiment 2, uplink service usage and downlink service usage of the UE are taken into consideration in Embodiment 4.

Embodiment 5

Figure 5:
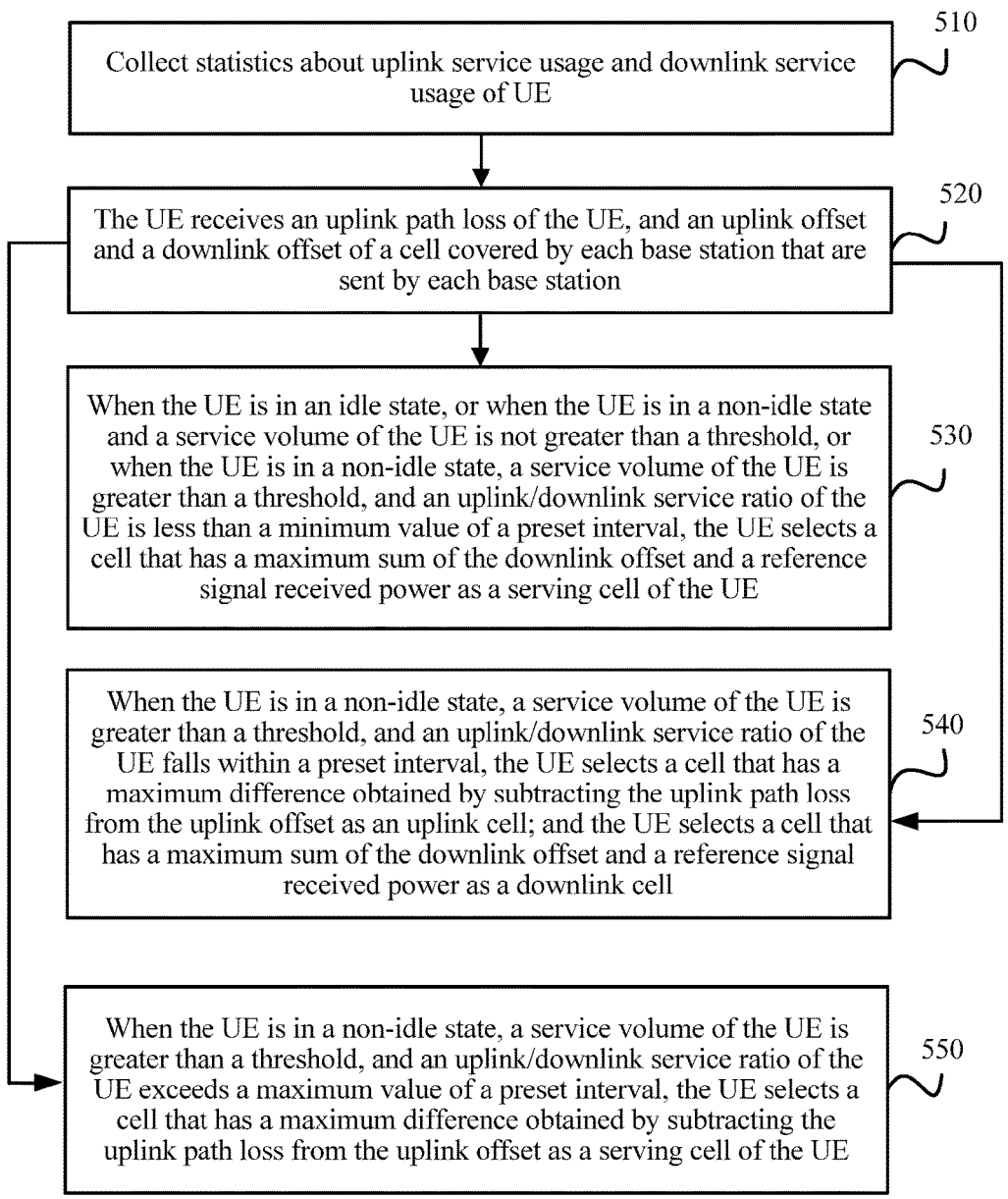
FIG. 5 is a flowchart of a cell selection method in a wireless network according to Embodiment 5 of the present invention.

Based on Embodiment 2, Embodiment 5 of the present invention provides a cell selection method in a wireless network. FIG. 5 is a flowchart of a cell selection method in a wireless network according to this embodiment of the present invention. In this embodiment, the method is executed by UE. The method specifically includes the following steps.

Step 510: Collect statistics about uplink service usage and downlink service usage of the UE, so as to calculate an uplink/downlink service ratio of the UE.

Step 520: The UE receives an uplink path loss of the UE, and an uplink offset and a downlink offset of a cell covered by each base station that are sent by each base station.

A specific execution process of step 520 is the same as step 210 in the foregoing embodiment, and details are not described herein again.

Step 530: When the UE is in an idle state, or when the UE is in a non-idle state and a service volume of the UE is not greater than a threshold, or when the UE is in a non-idle state, a service volume of the UE is greater than a threshold, and an uplink/downlink service ratio of the UE is less than a minimum value of a preset interval, the UE selects a cell that has a maximum sum of the downlink offset and the reference signal received power as a serving cell of the UE.

Step 540: When the UE is in a non-idle state, a service volume of the UE is greater than a threshold, and an uplink/downlink service ratio of the UE falls within a preset interval, the UE selects a cell that has a maximum difference obtained by subtracting the uplink path loss from the uplink offset as an uplink cell; and the UE selects a cell that has a maximum sum of the downlink offset and the reference signal received power as a downlink cell.

Step 550: When the UE is in a non-idle state, a service volume of the UE is greater than a threshold, and an uplink/downlink service ratio of the UE exceeds a maximum value of a preset interval, the UE selects a cell that has a maximum difference obtained by subtracting the uplink path loss from the uplink offset as a serving cell of the UE.

Base on the foregoing Embodiment 2, a service requirement condition uplink service usage, and downlink service usage that are of the UE are taken into consideration in Embodiment 5.

Embodiment 6

Figure 6:
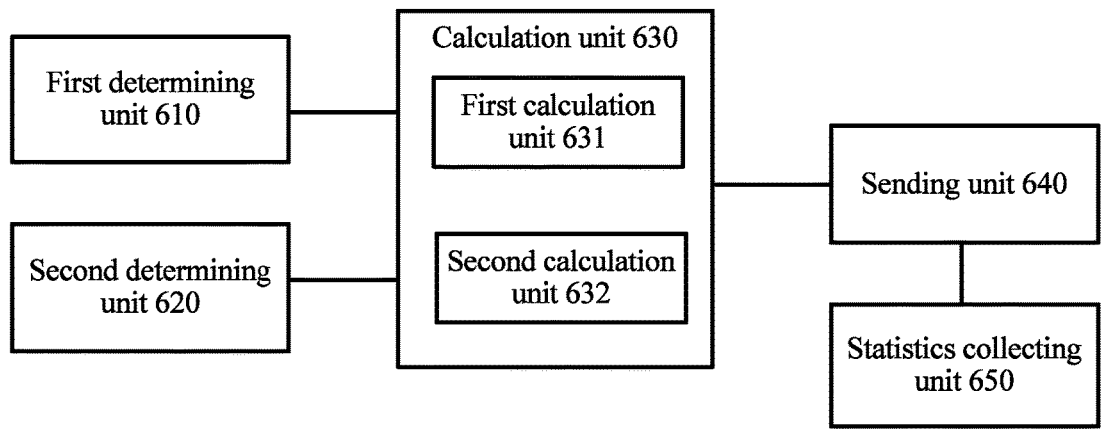
FIG. 6 is a schematic structural diagram of a base station according to Embodiment 6 of the present invention.

Correspondingly, this embodiment of the present invention provides a base station, to implement the cell selection method in a wireless network provided in the foregoing Embodiment 1. As shown in FIG. 6, the base station includes: a first determining unit 610, a second determining unit 620, a calculation unit 630, a sending unit 640, and a statistics collecting unit 650.

The first determining unit 610 is configured to determine available uplink and downlink capacities of each cell in multiple cells covered by the base station; The second determining unit 620 is configured to determine available uplink and downlink capacities of a backhaul link of the base station. The calculation unit 630 is configured to determine an uplink offset and a downlink offset of each cell according to the available uplink and downlink capacities of each cell and the available uplink and downlink capacities of the backhaul link of the base station. The statistics collecting unit 650 is configured to determine an uplink path loss of user equipment UE. The sending unit 640 is configured to send a message to the UE, where the message carries the uplink path loss, the uplink offset, and the downlink offset, and the uplink path loss, the uplink offset, and the downlink offset are used by the UE to perform cell selection.

Specifically, the first determining unit 610 is specifically configured to: perform grid division on each cell; determine a maximum capacity of each cell according to a system bandwidth, a service volume of each grid, and a signal-to-noise ratio of a reference signal of each grid; obtain uplink and downlink throughputs of each cell; and determine the available uplink and downlink capacities of each cell, where the available uplink capacity of each cell is a difference obtained by subtracting the uplink throughput from the maximum capacity of each cell, and the available downlink capacity of each cell is a difference obtained by subtracting the downlink throughput from the maximum capacity of each cell.

The second determining unit 620 is specifically configured to: obtain maximum uplink and downlink capacities of the backhaul link of the base station; obtain uplink and downlink throughputs of the backhaul link of the base station; and determine the available uplink and downlink capacities of the backhaul link of the base station, where the available uplink capacity of the backhaul link of the base station is a difference obtained by subtracting the uplink throughput from the maximum uplink capacity of the backhaul link of the base station, and the available downlink capacity of the backhaul link of the base station is a difference obtained by subtracting the downlink throughput from the maximum downlink capacity of the backhaul link of the base station.

Optionally, the calculation unit 630 includes: a first calculation unit 631, configured to calculate the uplink offset.

The first calculation unit 631 is specifically configured to calculate an uplink offset of a cell. For details, refer to formula 5.

The calculation unit 630 further includes: a second calculation unit 632, configured to calculate the downlink offset.

The second calculation unit 632 is specifically configured to calculate a downlink offset of a cell. For details, refer to formula 6.

According to the base station provided in this embodiment of the present invention, an uplink offset and a downlink offset of a cell are calculated according to available uplink and downlink capacities of the cell and available uplink and downlink capacities of a backhaul link of the base station, and an uplink path loss, and the uplink offset and the downlink offset of the cell are sent to UE, so that the UE can perform cell selection according to the uplink path loss, the uplink offset, and the downlink offset that are sent by the base station. A feature of an access network, a feature of a backhaul link, and a feature of a service are fully considered, and both an uplink service and a downlink service that match UE can be taken into consideration for cell selection, so as to achieve better network performance.

Embodiment 7

Figure 7:
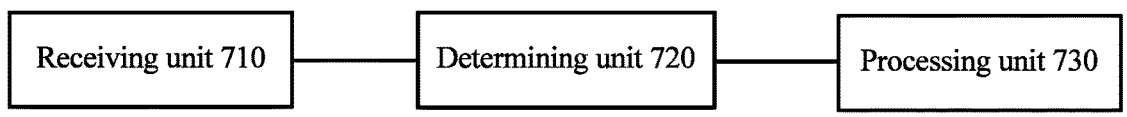
FIG. 7 is a schematic structural diagram of UE according to Embodiment 7 of the present invention.

Correspondingly, this embodiment of the present invention provides UE, to implement the cell selection methods in a wireless network that are provided in the foregoing Embodiment 2 to Embodiment 5. As shown in FIG. 7, the UE includes a receiving unit 710, a determining unit 720, and a processing unit 730.

The receiving unit 710 is configured to receive messages sent by at least two base stations, where each of the messages carries an uplink path loss of the UE, and an uplink offset and a downlink offset of a cell covered by each base station.

The determining unit 720 is configured to determine a reference signal received power.

The processing unit 730 is configured to: when the UE is in a non-idle state, select a cell that has a maximum difference obtained by subtracting the uplink path loss from the uplink offset as an uplink cell, and select a cell that has a maximum sum of the downlink offset and the reference signal received power as an uplink cell.

The processing unit 730 is further configured to: when the UE is in an idle state, select a cell that has a maximum sum of the downlink offset and the reference signal received power as a serving cell of the UE.

In an optional solution, when the UE is in the non-idle state, the processing unit 730 is specifically configured to: when a service volume of the UE is greater than a threshold, select the cell that has a maximum difference obtained by subtracting the uplink path loss from the uplink offset as the uplink cell, and select the cell that has a maximum sum of the downlink offset and the reference signal received power as the downlink cell; or when a service volume of the UE is less than or equal to a threshold, select the cell that has a maximum sum of the downlink offset and the reference signal received power as the serving cell.

In another optional solution, when the UE is in the non-idle state, the processing unit 730 is further specifically configured to: when an uplink/downlink service ratio of the UE falls within a preset interval, select the cell that has a maximum difference obtained by subtracting the uplink path loss from the uplink offset as the uplink cell, and select the cell that has a maximum sum of the downlink offset and the reference signal received power as the downlink cell; when an uplink/downlink service ratio is greater than a maximum value of a preset interval, select the cell that has a maximum difference obtained by subtracting the uplink path loss from the uplink offset as the serving cell; or when an uplink/downlink service ratio is less than a minimum value of a preset interval, select the cell that has a maximum sum of the downlink offset and the reference signal received power as the serving cell.

According to the UE provided in this embodiment of the present invention, cell selection may be performed according to an uplink path loss, an uplink offset, and a downlink offset that are sent by a base station. A feature of an access network, a feature of a backhaul link, and a feature of a service are fully considered, and both an uplink service and a downlink service that match UE can be taken into consideration for cell selection, so as to achieve better network performance.

Embodiment 8

Figure 8:
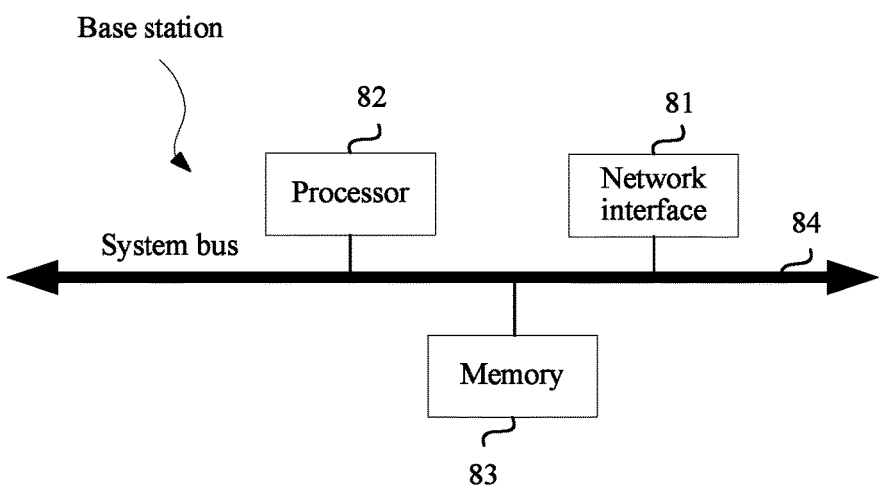
FIG. 8 is a schematic structural diagram of a base station according to Embodiment 8 of the present invention.

Correspondingly, this embodiment of the present invention provides a base station, to implement a cell selection method provided in the foregoing Embodiment 1. As shown in FIG. 8, the base station includes a processor 82 and a memory 83. A system bus 84 is configured to connect the processor 82 and the memory 83.

The processor 82 may be a processor, or may be a general term of multiple processing elements. For example, the processor 82 may be a central processing unit (CPU), or may be an application-specific integrated circuit (ASIC), or one or more integrated circuits configured to implement this embodiment of the present invention, for example, one or more digital signal processors (DSP) or one or more field programmable gate arrays (FPGA).

The memory 83 may be a storage apparatus, or may be a general term of multiple storage elements, and is configured to store executable program code, or a parameter, data, and the like that are required for running of the base station. In addition, the memory 83 may include a random access memory (RAM), and may further include a non-volatile memory (non-volatile memory), for example, a disk memory and a flash memory (Flash).

The system bus 84 may be an Industry Standard Architecture (ISA) bus, a Peripheral Component Interconnect (PCI) bus, an Extended Industry Standard Architecture (EISA) bus, or the like. The system bus 84 may be classified into an address bus, a data bus, a control bus, and the like. For convenience of denotation, the bus is represented by using only one thick line in FIG. 8; however, it does not indicate that there is only one bus or only one type of bus.

Optionally, the base station further includes: a network interface 81, configured to communicate with a terminal of the Internet of Things, an access gateway of the Internet of Things, a bearer network, a serving gateway of the Internet of Things, and an application server.

Upon startup, these software components are loaded into the memory 83, and then are accessed by the processor 82 to execute the following instructions: determining available uplink and downlink capacities of each cell in multiple cells covered by the base station; determining available uplink and downlink capacities of a backhaul link of the base station; determining an uplink offset and a downlink offset of each cell according to the available uplink and downlink capacities of each cell and the available uplink and downlink capacities of the backhaul link of the base station; determining an uplink path loss of user equipment UE; and sending a message to the user equipment UE by using the network interface 81, where the message carries the uplink path loss, the uplink offset, and the downlink offset, and the uplink path loss, the uplink offset, and the downlink offset are used by the UE to perform cell selection.

Optionally, the application program includes the following instructions that can be used by the processor 82 to determine the available uplink and downlink capacities of each cell in multiple cells covered by the base station: performing grid division on each cell; determining a maximum capacity of each cell according to a system bandwidth, a service volume of each grid, and a signal-to-noise ratio of a reference signal of each grid; obtaining uplink and downlink throughputs of each cell; and determining the available uplink and downlink capacities of each cell, where the available uplink capacity of each cell is a difference obtained by subtracting the uplink throughput from the maximum capacity of each cell, and the available downlink capacity of each cell is a difference obtained by subtracting the downlink throughput from the maximum capacity of each cell.

Optionally, the application program includes the following instructions that can be used by the processor 82 to determine the available uplink and downlink capacities of the backhaul link of the base station: obtaining maximum uplink and downlink capacities of the backhaul link of the base station; obtaining uplink and downlink throughputs of the backhaul link of the base station; and determining the available uplink and downlink capacities of the backhaul link of the base station, where the available uplink capacity of the backhaul link of the base station is a difference obtained by subtracting the uplink throughput from the maximum uplink capacity of the backhaul link of the base station, and the available downlink capacity of the backhaul link of the base station is a difference obtained by subtracting the downlink throughput from the maximum downlink capacity of the backhaul link of the base station.

Optionally, the application program specifically includes the following instruction that can be used by the processor 82 to calculate the uplink offset: the application program is used by the processor to calculate the uplink offset according to a formula $$UCR \propto \alpha Capacity_{c,UL}^{avl} + (1-\alpha)Capacity_{bck,UL}^{avl},$$

where UCR is an uplink offset of a cell c, $Capacity_{c,UL}^{avl}$ is an available uplink capacity of the cell c, $Capacity_{bck,UL}^{avl}$ is an available uplink capacity of a backhaul link of the base station, and α is a ratio of an importance degree of an uplink access link to an importance degree of an uplink backhaul link.

Optionally, the application program specifically includes the following instruction that can be used by the processor 82 to calculate the downlink offset: the application program is used by the processor to calculate the downlink offset according to a formula $$CRE \propto \beta Capacity_{c,DL}^{avl} + (1-\beta)Capacity_{bck,DL}^{avl},$$

where CRE is a downlink offset of a cell c, $Capacity_{c,DL}^{avl}$ is an available downlink capacity of the cell c, $Capacity_{bck,DL}^{avl}$ is an available downlink capacity of a backhaul link of the base station, and β is a ratio of an importance degree of a downlink access link to an importance degree of a downlink backhaul link.

According to the base station provided in this embodiment of the present invention, an uplink offset and a downlink offset of a cell are calculated according to available uplink and downlink capacities of the cell and available uplink and downlink capacities of a backhaul link of the base station, and an uplink path loss, the uplink offset, and the downlink offset are sent to UE, so that the UE can perform cell selection according to the uplink path loss, the uplink offset, and the downlink offset that are sent by the base station. A feature of an access network, a feature of a backhaul link, and a feature of a service are fully considered, and both an uplink service and a downlink service that match UE can be taken into consideration for cell selection, so as to achieve better network performance.

Embodiment 9

Figure 9:
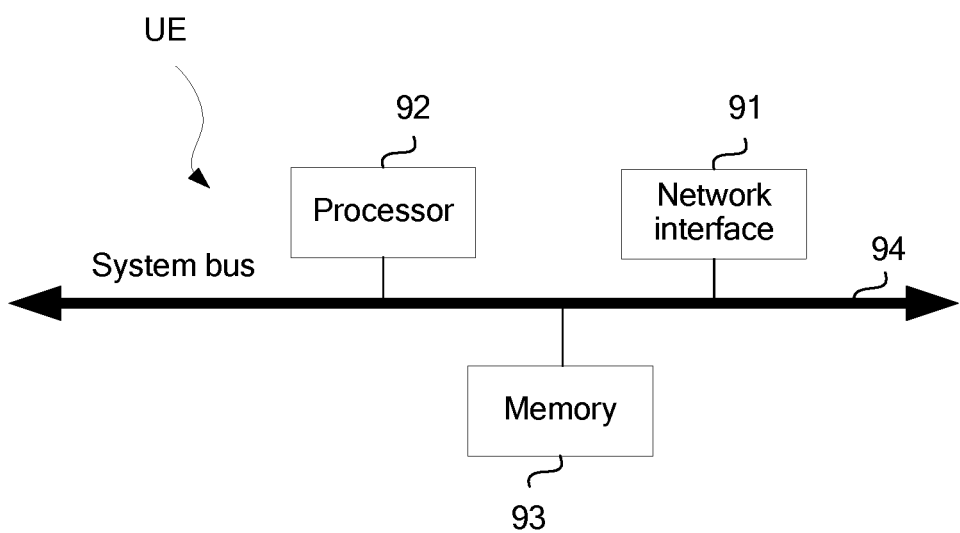
FIG. 9 is a schematic structural diagram of UE according to Embodiment 9 of the present invention.

Correspondingly, this embodiment of the present invention provides UE, to implement a network optimization method provided in the foregoing Embodiment 2 to Embodiment 6. As shown in FIG. 9, the UE includes a processor 92 and a memory 93. A system bus 94 is configured to connect the processor 92 and the memory 93.

The processor 92 may be a processor, or may be a general term of multiple processing elements. For example, the processor 92 may be a central processing unit (CPU), or may be an application-specific integrated circuit (ASIC), or one or more integrated circuits configured to implement this embodiment of the present invention, for example, one or more digital signal processors (DSP) or one or more field programmable gate arrays (FPGA).

The memory 93 may be a storage apparatus, or may be a general term of multiple storage elements, and is configured to store executable program code, or a parameter, data, and the like that are required for running of a base station. In addition, the memory 93 may include a random access memory (RAM), and may further include a non-volatile memory (non-volatile memory), for example, a disk memory and a flash memory (Flash).

The system bus 94 may be an Industry Standard Architecture (ISA) bus, a Peripheral Component Interconnect (PCI) bus, an Extended Industry Standard Architecture (EISA) bus, or the like. The system bus 94 may be classified into an address bus, a data bus, a control bus, and the like. For convenience of denotation, the bus is represented by using only one thick line in FIG. 9; however, it does not indicate that there is only one bus or only one type of bus.

Optionally, the UE further includes: a network interface 91, configured to communicate with a terminal of the Internet of Things, an access gateway of the Internet of Things, a bearer network, a serving gateway of the Internet of Things, and an application server.

Upon startup, these software components are loaded into the memory 93, and then are accessed by the processor 92 to execute the following instructions: receiving, by using the network interface 91, messages sent by at least two base stations, where the messages carry an uplink path loss of the UE, and uplink offsets and downlink offsets of multiple cells covered by the base stations; determining a reference signal received power; and when the UE is in a non-idle state, selecting a cell that has a maximum difference obtained by subtracting the uplink path loss from the uplink offset as an uplink cell, and selecting a cell that has a maximum sum of the downlink offset and the reference signal received power as a downlink cell.

Optionally, the application program further includes an instruction that can be used by the processor 92 to perform the following process: when the UE is in an idle state, selecting a cell that has a maximum sum of the downlink offset and the reference signal received power as a serving cell.

Optionally, the application program includes the following instructions that can be used by the processor 92 to perform a process in which when the UE is in a non-idle state, selecting a cell that has a maximum difference obtained by subtracting the uplink path loss from the uplink offset as an uplink cell, and selecting a cell that has a maximum sum of the downlink offset and the reference signal received power as a downlink cell: when the UE is in the non-idle state and a service volume is greater than a threshold, selecting the cell that has a maximum difference obtained by subtracting the uplink path loss from the uplink offset as the uplink cell, and selecting the cell that has a maximum sum of the downlink offset and the reference signal received power as the downlink cell.

Optionally, the application program further includes an instruction that can be used by the processor 92 to perform the following process: when the UE is in the non-idle state and a service volume of the UE is less than or equal to a threshold, selecting the cell that has a maximum sum of the downlink offset and the reference signal received power as the serving cell.

Optionally, the application program includes the following instructions that can be used by the processor 92 to perform a process in which when the UE is in a non-idle state, selecting a cell that has a maximum difference obtained by subtracting the uplink path loss from the uplink offset as an uplink cell, and selecting a cell that has a maximum sum of the downlink offset and the reference signal received power as a downlink cell: when the UE is in the non-idle state and an uplink/downlink service ratio of the UE falls within a preset interval, selecting the cell that has a maximum difference obtained by subtracting the uplink path loss from the uplink offset as the uplink cell, and selecting the cell that has a maximum sum of the downlink offset and the reference signal received power as the downlink cell.

Optionally, the application program further includes instructions that can be used by the processor 92 to perform the following process: when an uplink/downlink service ratio of the UE is greater than a maximum value of a preset interval, selecting the cell that has a maximum difference obtained by subtracting the uplink path loss from the uplink offset as the serving cell; or when an uplink/downlink service ratio of the UE is less than a minimum value of a preset interval, selecting the cell that has a maximum sum of the downlink offset and the reference signal received power as the serving cell.

According to the UE provided in this embodiment of the present invention, cell selection may be performed according to an uplink path loss, an uplink offset, and a downlink offset that are sent by a base station. A feature of an access network, a feature of a backhaul link, and a feature of a service are fully considered, and both an uplink service and a downlink service that match UE can be taken into consideration for cell selection, so as to achieve better network performance.

Professional personnel may be further aware that in combination with the examples described in the embodiments disclosed in this specification, units and algorithm steps may be implemented by electronic hardware or circuits, and the foregoing has generally described compositions and steps of each example according to functions. A person skilled in the art may use different methods to implement the described functions for each particular application, but it should not be considered that the implementation goes beyond the scope of the embodiments of the present invention. Specifically, a part of the calculation and control may be implemented by using logical hardware, and the logical hardware may be a logical integrated circuit manufactured by an integrated circuit process, which is not limited in the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   determining available uplink and downlink capacities of each cell in a plurality of cells covered by a base station, wherein determining the available uplink and downlink capacities of each cell in the plurality of cells covered by the base station comprises, for each cell, performing the following:
      performing grid division on the respective cell to determine a plurality of grids;
      determining a maximum capacity of the respective cell according to a system bandwidth, a service volume of each grid of the plurality of grids comprised in the respective cell, and a signal-to-noise ratio of a reference signal of each grid of the plurality of grids comprised in the respective cell;
      obtaining uplink and downlink throughputs of the respective cell; and
      determining the available uplink and downlink capacities of the respective cell, wherein the available uplink capacity of the respective cell is a difference obtained by subtracting the uplink throughput of the respective cell from the maximum capacity of the respective cell, and the available downlink capacity of the respective cell is a difference obtained by subtracting the downlink throughput of the respective cell from the maximum capacity of the respective cell;
   determining available uplink and downlink capacities of a backhaul link of the base station;
   determining an uplink offset and a downlink offset of each cell according to the available uplink and downlink capacities of each cell and the available uplink and downlink capacities of the backhaul link of the base station;
   determining an uplink path loss of user equipment (UE); and
   sending a message to the UE, wherein the message carries the uplink path loss of the UE, the determined uplink offset of each cell of the plurality of cells, and the determined downlink offset of each cell of the plurality of cells, wherein the uplink path loss of the UE, the determined uplink offset of each cell of the plurality of cells, and the determined downlink offset of each cell of the plurality of cells are used by the UE to perform cell selection.

2. The method according to claim 1, wherein determining available uplink and downlink capacities of the backhaul link of the base station comprises:
   obtaining maximum uplink and downlink capacities of the backhaul link of the base station;
   obtaining uplink and downlink throughputs of the backhaul link of the base station; and
   determining the available uplink and downlink capacities of the backhaul link of the base station, wherein the available uplink capacity of the backhaul link of the base station is a difference obtained by subtracting the uplink throughput from the maximum uplink capacity of the backhaul link of the base station, and the available downlink capacity of the backhaul link of the base station is a difference obtained by subtracting the downlink throughput from the maximum downlink capacity of the backhaul link of the base station.

3. The method according to claim 1, wherein the uplink offset of each cell is calculated according to the following relation:

$$UCR \propto \alpha Capacity_{c,UL}^{avl} + (1-\alpha) Capacity_{bck,UL}^{avl},$$

wherein UCR is the uplink offset of a cell c, $Capacity_{c,UL}^{avl}$ is an available uplink capacity of the cell c, $Capacity_{bck,UL}^{avl}$ is an available uplink capacity of a backhaul link of the base station, and $\alpha$ is a ratio of an importance degree of an uplink access link to an importance degree of an uplink backhaul link.

4. The method according to claim 1, wherein the downlink offset of each cell is calculated according to the following relation:

$$CRE \propto \beta Capacity_{c,DL}^{avl} + (1-\beta) Capacity_{bck,DL}^{avl},$$

wherein CRE is the downlink offset of a cell c, $Capacity_{c,DL}^{avl}$ is an available downlink capacity of the cell c, $Capacity_{bck,DL}^{avl}$ is an available downlink capacity of a backhaul link of the base station, and $\beta$ is a ratio of an importance degree of a downlink access link to an importance degree of a downlink backhaul link.

5. A base station, comprising:
   a first determining unit, configured to determine available uplink and downlink capacities of each cell in a plurality of cells covered by the base station, wherein the first determining unit being configured to determine the available uplink and downlink capacities of each cell in the plurality of cells covered by the base station comprises the first determining unit being configured to, for each cell, perform the following:
      perform grid division on the respective cell to determine a plurality of grids;
      determine a maximum capacity of the respective cell according to a system bandwidth, a service volume of each grid of the plurality of grids comprised in the respective cell, and a signal-to-noise ratio of a reference signal of each grid of the plurality of grids comprised in the respective cell;
      obtain uplink and downlink throughputs of the respective cell; and
      determine the available uplink and downlink capacities of the respective cell, wherein the available uplink capacity of the respective cell is a difference obtained by subtracting the uplink throughput of the respective cell from the maximum capacity of the respective cell, and the available downlink capacity of the respective cell is a difference obtained by subtracting the downlink throughput of the respective cell from the maximum capacity of the respective cell;
a second determining unit, configured to determine available uplink and downlink capacities of a backhaul link of the base station;
a calculation unit, configured to determine an uplink offset and a downlink offset of each cell according to the available uplink and downlink capacities of each cell and the available uplink and downlink capacities of the backhaul link of the base station;
a statistics collecting unit, configured to determine an uplink path loss of user equipment (UE); and
a sending unit, configured to send a message to the UE, wherein the message carries the uplink path loss of the UE, the determined uplink offset of each cell of the plurality of cells, and the determined downlink offset of each cell of the plurality of cells, wherein the uplink path loss of the UE, the determined uplink offset of each cell of the plurality of cells, and the determined downlink offset of each cell of the plurality of cells are used by the UE to perform cell selection.

6. The base station according to claim 5, wherein the second determining unit is further configured to:
obtain maximum uplink and downlink capacities of the backhaul link of the base station;
obtain uplink and downlink throughputs of the backhaul link of the base station; and
determine the available uplink and downlink capacities of the backhaul link of the base station, wherein the available uplink capacity of the backhaul link of the base station is a difference obtained by subtracting the uplink throughput from the maximum uplink capacity of the backhaul link of the base station, and the available downlink capacity of the backhaul link of the base station is a difference obtained by subtracting the downlink throughput from the maximum downlink capacity of the backhaul link of the base station.

7. The base station according to claim 5, wherein the calculation unit comprises a first calculation unit, configured to calculate each uplink offset according to the following formula:

$$UCR \propto \alpha Capacity_{c,UL}^{avl} + (1-\alpha) Capacity_{bck,UL}^{avl},$$

wherein UCR is the uplink offset of a cell c, $Capacity_{c,UL}^{avl}$ is an available uplink capacity of the cell c, $Capacity_{bck,UL}^{avl}$ is an available uplink capacity of a backhaul link of the base station, and α is a ratio of an importance degree of an uplink access link to an importance degree of an uplink backhaul link.

8. The base station according to claim 5, wherein the calculation unit comprises a second calculation unit, configured to calculate each downlink offset according to the following formula:

$$CRE \propto \beta Capacity_{c,DL}^{avl} + (1-\beta) Capacity_{bck,DL}^{avl},$$

wherein CRE is the downlink offset of a cell c, $Capacit_{c,DL}^{avl}$ is an available downlink capacity of the cell c, $Capacity_{bck,DL}^{avl}$ is an available downlink capacity of a backhaul link of the base station, and β is a ratio of an importance degree of a downlink access link to an importance degree of a downlink backhaul link.

9. A base station, comprising:
a processor,
a non-transitory memory; and
an application program stored in the memory, wherein the application program comprises instructions used by the processor to perform the following process:
determining available uplink and downlink capacities of each cell in a plurality of cells covered by the base station, wherein determining the available uplink and downlink capacities of each cell in the plurality of cells covered by the base station comprises, for each cell, performing the following:
performing grid division on the respective cell to determine a plurality of grids;
determining a maximum capacity of the respective cell according to a system bandwidth, a service volume of each grid of the plurality of grids comprised in the respective cell, and a signal-to-noise ratio of a reference signal of each grid of the plurality of grids comprised in the respective cell;
obtaining uplink and downlink throughputs of the respective cell; and
determining the available uplink and downlink capacities of the respective cell, wherein the available uplink capacity of the respective cell is a difference obtained by subtracting the uplink throughput of the respective cell from the maximum capacity of the respective cell, and the available downlink capacity of the respective cell is a difference obtained by subtracting the downlink throughput of the respective cell from the maximum capacity of the respective cell;
determining available uplink and downlink capacities of a backhaul link of the base station;
determining an uplink offset and a downlink offset of each cell according to the available uplink and downlink capacities of each cell and the available uplink and downlink capacities of the backhaul link of the base station;
determining an uplink path loss of user equipment (UE); and
sending a message to the UE, wherein the message carries the uplink path loss of the UE, the determined uplink offset of each cell of the plurality of cells, and the determined downlink offset of each cell of the plurality of cells, wherein the uplink path loss of the UE, the determined uplink offset of each cell of the plurality of cells, and the determined downlink offset of each cell the plurality of cells are used by the UE to perform cell selection.

10. The base station according to claim 9, wherein the application program comprises the following instructions used by the processor to determine the available uplink and downlink capacities of the backhaul link of the base station:
obtaining maximum uplink and downlink capacities of the backhaul link of the base station;
obtaining uplink and downlink throughputs of the backhaul link of the base station; and
determining the available uplink and downlink capacities of the backhaul link of the base station, wherein the available uplink capacity of the backhaul link of the base station is a difference obtained by subtracting the uplink throughput from the maximum uplink capacity of the backhaul link of the base station, and the available downlink capacity of the backhaul link of the base station is a difference obtained by subtracting the downlink throughput from the maximum downlink capacity of the backhaul link of the base station.

11. The base station according to claim 9, wherein the application program comprises the following instructions used by the processor to calculate the uplink offset:
  calculating each uplink offset according to a formula $$UCR \propto \alpha Capacity_{c,UL}^{avl} + (1-\alpha)Capacity_{bck,UL}^{avl},$$

wherein UCR is the uplink offset of a cell c, $Capacity_{c,UL}^{avl}$ is an available uplink capacity of the cell c, $Capacity_{bck,UL}^{avl}$ is an available uplink capacity of a backhaul link of the base station, and a is a ratio of an importance degree of an uplink access link to an importance degree of an uplink backhaul link.

12. The base station according to claim 9, wherein the application program comprises the following instructions used by the processor to calculate the downlink offset:
  calculating each downlink offset according to a formula $$CRE \propto \beta Capacity_{c,DL}^{avl} + (1-\beta)Capacity_{bck,DL}^{avl},$$

wherein CRE is the downlink offset of a cell c, $Capacity_{c,DL}^{avl}$ is an available downlink capacity of the cell c, $Capacity_{bck,DL}^{avl}$ is an available downlink capacity of a backhaul link of the base station, and $\beta$ is a ratio of an importance degree of a downlink access link to an importance degree of a downlink backhaul link.

* * * * *